(12) United States Patent
Johnsson et al.

(10) Patent No.: US 8,659,597 B2
(45) Date of Patent: Feb. 25, 2014

(54) MULTI-VIEW RAY TRACING USING EDGE DETECTION AND SHADER REUSE

(75) Inventors: Björn Johnsson, Eslöv (SE); Magnus Andersson, Helsingborg (SE); Tomas G. Akenine-Möller, Lund (SE); Carl J. Munkberg, Malmö (SE); Franz P. Clarberg, Lund (SE); Jon N. Hasselgren, Bunkeflostrand (SE)

(73) Assignee: Intel Corporation, Santa Clara, CA (US)

( * ) Notice: Subject to any disclaimer, the term of this patent is extended or adjusted under 35 U.S.C. 154(b) by 657 days.

(21) Appl. No.: 12/890,754

(22) Filed: Sep. 27, 2010

(65) Prior Publication Data

US 2012/0075303 A1 Mar. 29, 2012

(51) Int. Cl.
*G06T 15/40* (2011.01)
*G06T 15/04* (2011.01)
*G06T 1/60* (2006.01)

(52) U.S. Cl.
USPC ............................ 345/421; 345/582; 345/583

(58) Field of Classification Search
None
See application file for complete search history.

(56) References Cited

U.S. PATENT DOCUMENTS

| 6,560,722 | B1 * | 5/2003 | Frankel et al. ............. 714/38.11 |
| 7,113,191 | B2 | 9/2006 | Lake et al. |
| 7,206,449 | B2 | 4/2007 | Raskar |
| 7,286,138 | B2 | 10/2007 | Hoppe |
| 7,738,725 | B2 | 6/2010 | Raskar et al. |

OTHER PUBLICATIONS

Berthold K.P. Horn and Robert W. Sjoberg, "Calculating the reflectance map", Applied Optics, vol. 18, No. 11, Jun. 1, 1979, pp. 1770-1779.*
PCT/US2011/053549 Search Report with Written Opinion of the International Searching Authority mailed Apr. 26, 2012 (8 pgs).
Chai, J.-X., Tong, X., Chan, S.-C., and Shum, H.-Y. 2000. Plenoptic Sampling. In Proceedings of ACM SIGGRAPH, 307-318.
Chen, S. E., and Williams, L. 1993. View Interpolation for Image Synthesis. In Proceedings of ACM SIGGRAPH, 279-288.
Egan, K., Tseng, Y.-T., Holzschuch, N., Durand, F., and Ramamoorthi, R. 2009. Frequency Analysis and Sheared Reconstruction for Rendering Motion Blur. ACM Transactions on Graphics, 28, 3, article No. 93.
Hachisuka, T., Jarosz, W., Weistroffer, R., K. Dale, G. H., Zwicker, M., and Jensen, H. W. 2008. Multidimensional Adaptive Sampling and Reconstruction for Ray Tracing. ACM Transactions on Graphics, 27, 3, 33.1-33.10.
Halle, M. 1994. Holographic stereograms as discrete imaging systems. In Practical Holography VIII (Proceedings of SPIE), vol. 2176, 73-84.

(Continued)

*Primary Examiner* — Kee M Tung
*Assistant Examiner* — Sing-Wai Wu
(74) *Attorney, Agent, or Firm* — Trop, Pruner & Hu, P.C.

(57) ABSTRACT

A multi-view image may be generated by detecting discontinuities in a radiance function using multi-view silhouette edges. A multi-view silhouette edge is an edge of a triangle that intersects a back tracing plane and, in addition, the triangle faces backwards, as seen from the intersection point, and the edge is not further connected to any back facing triangles. Analytical visibility may be computed between shading points and a camera line and shared shading computations may be reused.

30 Claims, 6 Drawing Sheets

(56) References Cited

OTHER PUBLICATIONS

Isaksen, A., McMillan, L., and Gortler, S. 2000. Dynamically Reparameterized Light Fields. In Proceedings of ACM SIGGRAPH, 297-306.

Kartch, D. 2000. Efficient Rendering and Compression for Full-Parallax Computer-Generated Holographic Stereograms. PhD thesis, Cornell University.

Levoy, M., and Hanrahan, P. 1996. Light Field Rendering. In Proceedings of ACM SIGGRAPH, 13-42.

Mark, W. R., McMillan, L., and Bishop, G. 1997. Post-Rendering 3D Warping. In Symposium on Interactive 3D Graphics, 7-16.

Max, N., and Ohsaki, K. 1995. Rendering Trees from Precomputed Z-Buffer Views. In Eurographics Rendering Workshop, 45-54.

Overbeck, R. S., Donner, C., and Ramamoorthi, R. 2009. Adaptive Wavelet Rending. ACM Transactions on Graphics, 28, 5, article No. 140.

Stewart, J., Yu, J., Gortler, S. J., and McMillan, L. 2003. A New Reconstruction Filter for Undersampled Light Fields. In Eurographics Symposium on Rendering, 150-156.

Zhang, C., and Chen, T. 2001. Generalized Plenoptic Sampling. Tech. Rep. AMP 01-06, Carnegie Mellon.

Zhang, C., and Chen, T. 2003. Spectral Analysis for Sampling Image-Based Rendering Data. IEEE Transactions on Circuits and Systems for Video Technology, 13, 11, 1038-1050.

Zwicker, M., Yea, S., Vetro, A., Forlines, C., Matusik, W., and Pfister, H. 2007. Display Pre-filtering for Multi-view Video Compression. In International Conference on Multimedia (ACM Multimedia), 1046-1053.

\* cited by examiner

MULTI-VIEW RAY TRACING USING EDGE DETECTION AND SHADER REUSE

BACKGROUND

This relates to multi-view displays and to graphics processing for generating images for multi-view displays.

Steroscopic rendering and 3D stereo displays are quickly going mainstream. The natural extension is autostereoscopic multi-view displays using parallax barriers or lenticular lenses to accommodate many simultaneous viewers without the need for active or passive glasses. Since these displays, for the foreseeable future, will support only a rather limited number of views, there is a large need for high-quality interperspective antialiasing.

DETAILED DESCRIPTION

We present a specialized algorithm for efficient multi-view image generation using ray tracing. We introduce multi-view silhouette edges to detect sharp discontinuities in the radiance function generated by geometrical edges in the scene. In addition, we exploit shader coherence by computing analytical visibility between shading points and the camera line, and by sharing shading computations.

Figure 1:
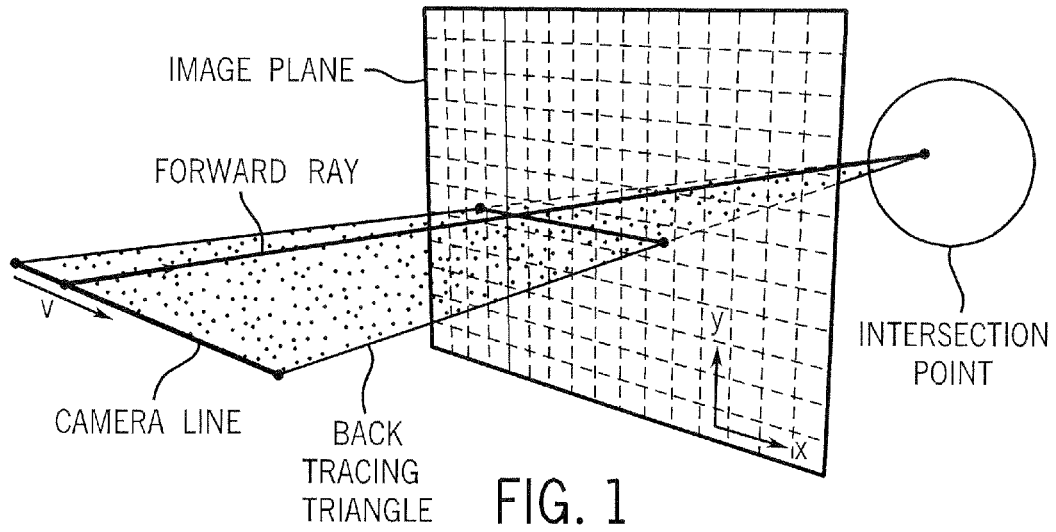
FIG. 1 is a schematic depiction to illustrate the concepts of a camera line, a forward ray, a back tracing triangle, and an image plane, in a simple example.

The space we want to sample has three dimensions, denoted $(x, y, v)$, where $v$ is the view parameter along the camera line, and $(x, y)$ are the image plane parameters. This is illustrated in FIG. 1.

Our goal is to sample and reconstruct the light field, $L(x, y, v)$, in order to display it in high-quality on an automultiscopic display. These displays conceptually have a grid of pixels, where each pixel can simultaneously display n distinct radiance values projected towards different positions, $v_i$, along the camera line. Each such view is visible within a small range, and there is usually some overlap between views based on the optical properties of the display. As the number of views is limited to a small number (e.g., 8-64), the display is severely bandwidth-limited along v.

To avoid interperspective aliasing, L is integrated against a view-dependent filter in the reconstruction step to compute n distinct images, $L_i$:

$$L_i(x,y) = \int L(x,y,v) g_i(v) dv, \quad (1)$$

where $g_i$ is the filter kernel for view i. This effectively replaces the strobing effect, seen when the human viewer moves, with blurring objects in front and behind the focus plane. Note that $L_i$ is also integrated against a spatial anti-aliasing filter as usual, when determining the final pixel values.

Random sampling of L is expensive. For each sample, a "forward ray" is sent from v through (x, y), in order to find the intersection with the scene, and the shading evaluated.

Discontinuities in L have two main causes: abrupt changes in the shading, and geometrical edges in the scene. We propose a specialized algorithm for multi-view ray tracing, which generates inexpensive samples by exploiting shading coherence that is inherent in multi-view settings. Instead of random sampling of geometric silhouette edges using forward rays, we analytically detect such edges by tracing a triangle backwards from an intersection point towards the camera line by "back tracing." See FIG. 9, block 102. We introduce a concept called multi-view silhouette edges to encode this data. For shading discontinuities, we continue to rely on adaptive sampling as the shader is a black box, for which no further information is known.

Due to the analytical detection of geometric edges, as a side-effect, we also know the exact extent of the visibility between a shading point and the camera line. Hence, we can insert any number of additional samples along the segments known to be visible, without any need for further ray tracing. The shading of these extra "back tracing samples" has a relatively low cost, as all view-independent computations can be re-used, e.g., the sampling of incident radiance.

In the reconstruction step, a continuous function is created based on the stored samples and edge information. Whereas previous methods go through great efforts to detect edges by computing per-sample gradients, we know the exact locations of geometric silhouette edges. This significantly improves the quality of the reconstruction, and hence of the final integrated result in some embodiments.

We describe how samples are generated, how multi-view silhouettes are computed, and how shading computations can be reused. When a forward ray, as seen in FIG. 1, hits a surface, shading is usually computed and stored as a sample in the (x, y, v)-set. We note that for the parts of the camera line (i.e., for the values of v that can "see" this intersection point), all view-independent parts of the shading can be reused for all such v's. The straightforward approach to exploit this coherence is to trace a set of rays from the forward ray's intersection point back to the camera line. However, this may cause variations in the sample density of different areas, and unless care is taken during reconstruction, this may cause geometric edges to translate slightly. See FIG. 7.

The back tracing part of our algorithm commences after a forward ray has hit an object at an intersection point. A back tracing triangle is created from that intersection point and the camera line, as seen in FIG. 1. The goal is then to compute which parts of the camera line are visible from the intersection point. We do this analytically using an approach where the last part resembles shadow volume rendering in the plane. All the triangle geometry in our scene is stored in a bounding volume hierarchy (BVH) using axis-aligned bounding boxes (AABBs). First, the BVH is traversed, and AABBs are checked for overlap against the back tracing triangle. This is done using an optimized triangle/AABB overlap test. Conceptually, if a triangle edge intersects the back tracing triangle, all the edges of that triangle which intersect the back tracing plane are inserted into a hash table with a hash key created from the indices of the two vertices of the edge.

Our definition of a silhouette edge is a triangle edge that intersects the back tracing plane, and in addition, the triangle is back facing as seen from the intersection point, and the edge is not further connected to any back facing triangles. This means that both open and closed 2-manifold surfaces can be handled. Since it is only the silhouette edges as seen from the intersection point that define visibility, we want to detect these silhouette edges rapidly.

We find silhouette edges using some optimizations. See FIG. 9, block 104. First, we only process the back facing triangles as seen from the intersection point. Second, the triangle that we test must intersect the plane of the back tracing triangle, and vice versa. Third, if we get a collision in the hash, this means that two back facing triangles sharing an edge both have inserted the shared edge. Since both triangles are back facing, the shared edge cannot be a silhouette edge, and so both entries are removed from the hash table. In addition, we detect when the triangle has a vertex that lies behind the intersection point and at least one in front. In those cases, which occur rather seldom, we clip the triangle against the back tracing triangle, and insert edges after that. After all processing has finished, all potential silhouette edges will be in the hash table.

Figure 2:
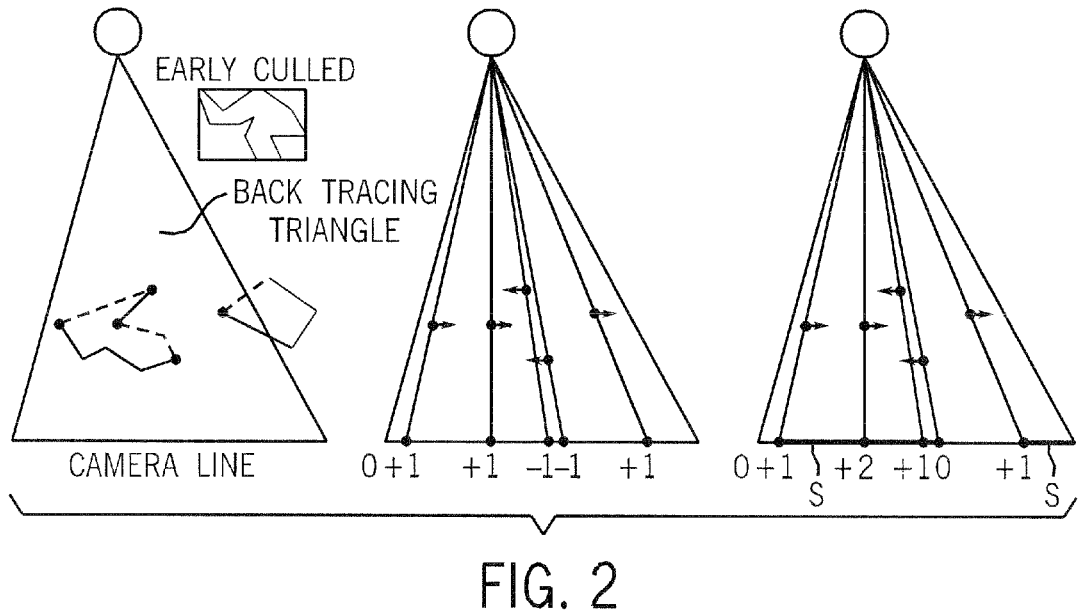
FIG. 2 is an illustration of how analytical visibility is computed in accordance with one embodiment of the present invention.

FIG. 2 is an illustration of how analytical visibility is computed from an intersection point (IP) back to the camera line. The occluders are only shown in two dimensions to simplify the illustration. Hence, a triangle in three dimensions becomes a line in two dimensions, and a silhouette edge becomes a "silhouette point" (black dots). The front facing lines, as seen from the intersection point are dashed. On the left of FIG. 2, the triangles of objects that cannot be early culled against the back tracing triangle are processed. A hash table is used to quickly find the silhouette points on the remaining lines. In the middle of FIG. 2, the winding of the silhouette points are used to give them either a weight +1 or −1. On the right in FIG. 2, when the weights are summed from left to right, the occluded parts are the segments with summed weight greater than zero. The black segments S on the camera line are occluded.

When all the silhouette edges have been found, the silhouette edges' intersection points with the plane of the back tracing triangle are processed from left to right along the camera line. See FIG. 9, block 106. A counter is initialized to the number of silhouette edges whose triangles originate outside and to the left of the backtracing triangle. Each point has either weight +1 or −1 according to its winding order (indicated with small arrows in FIG. 2). We compute the sum of the weights along the camera line, and when the sum is greater than zero, the camera line is occluded. Otherwise, it is visible from the intersection point. In the end, we only keep the outer silhouette points, i.e., the end points of the black segments S in FIG. 2. Note that since the intersection point is visible from at least one point on the camera line, situations where the entire camera line is occluded cannot occur.

Figure 3:
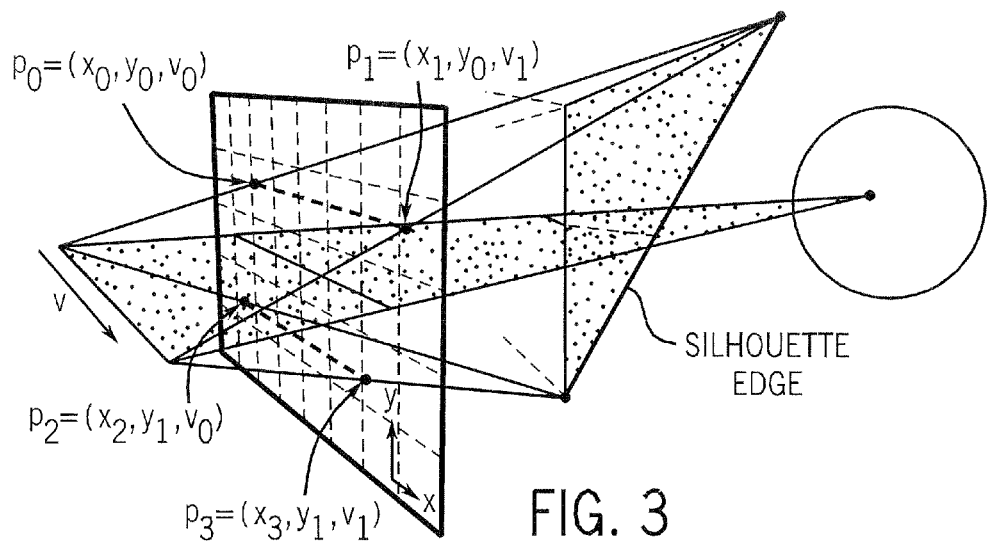
FIG. 3 is a schematic depiction of multi-view silhouette edge generation in accordance with one embodiment.

Multi-view silhouettes encode a representative subset of the geometric edges in the scene. In the back tracing step described above, we have identified a number of outer silhouette points. Each such point is generated from a triangle edge, which is a silhouette for at least some v on the camera line and y in the image plane. Projected to the image plane, each triangle edge is a line for a specific v. Seen in the three-dimensional (x, y, v)-space, these lines will trace out a surface which is a bilinear patch. We call these patches multi-view silhouette edges, but we will use the term patch interchangeably. The geometrical situation is illustrated in FIG. 3, where the multi-view silhouette edge is defined by the four points, $p_i$, $i \in \{0, 1, 2, 3\}$. The four points are obtained by projecting the triangle edge end points towards the end points of the camera line onto the image plane. When the end points of a silhouette edge are projected towards the end points of the camera line, four points, $p_0$, $p_1$, $P_2$, $p_3$, are obtained. These define the multi-view silhouette edge, which is a bilinear patch. The multi-view silhouette edges are used in our reconstruction algorithm to better preserve geometric edges. Note that the focus plane is identical to the image plane in FIG. 3.

Each multi-view silhouette edge locally partitions the sampling domain into disjoint regions, which represent geometrical discontinuities in the scene. In the reconstruction step, we will use this information to substantially improve the quality, essentially by using an edge-aware reconstruction filter. In the following, we will describe how the multi-view silhouettes are processed to construct an approximate edge representation with reasonable performance. See FIG. 9, block 108.

First, we note that it is only silhouettes that are visible from the camera line that are of interest. We know that at least one point on each patch is visible (the outer silhouette point found in the back tracing step), but other parts may very well be occluded by other patches. In general, only a limited region of each patch will be visible from the camera line.

As a first optimization, the extent of the multi-view silhouette edge in the v-dimension is reduced, if possible. We use the two planes of the triangles that share the silhouette edge to determine the range in v over which the edge is a true silhouette, and not merely an interior edge, as seen from the camera line. These planes are intersection tested against the camera line, and the camera line clipped accordingly.

Figure 4:
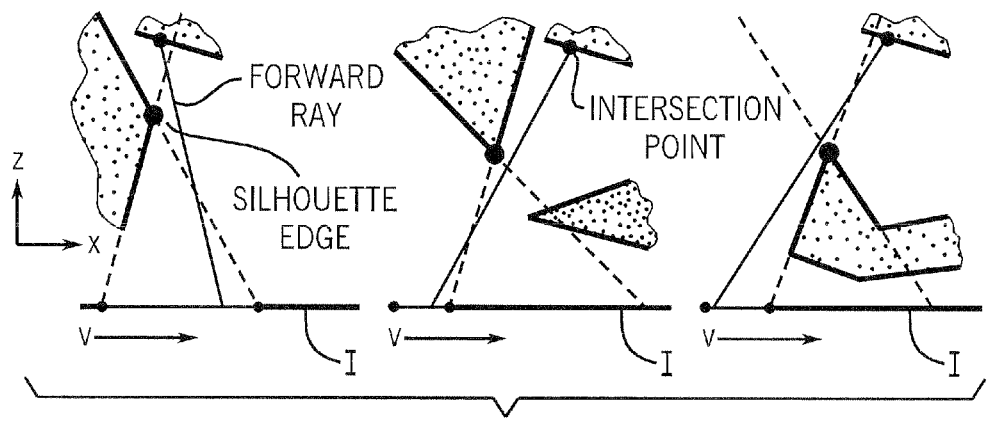
FIG. 4 is a depiction of a multi-view silhouette clipped in the v-dimension.

The common case and the two special cases are shown in FIG. 4. A multi-view silhouette is clipped in the v-dimension. We use the planes incident to the silhouette edge to limit the extent of the multi-view silhouette edge along the v-axis. The multi-view silhouette edges are clipped to the intervals I on the v-axis in FIG. 4. In all three cases, we can only keep the part of the camera line where the edge really is a silhouette, and where the intersection point is visible (from at least one point). We only keep the portion of the multi-view silhouette in which there is a point known to be visible from the camera line (i.e., the part where the forward ray originated from).

Second, we reduce the dimensionality of the problem by discretizing the y-dimension into, so called, y-buckets. Each bucket is centered around the coordinate $y_i$. It is usually sufficient with one or a few buckets per scanline, but more can be used in scenes with complex geometry. Instead of treating a multi-view silhouette as a bilinear patch, we store it as line segments in the (x, v) planes of the y-buckets. This significantly simplifies the algorithm, as all clipping and processing is performed in 2D.

For each bucket, a two-dimensional kD-tree is used to hold the line segments. Whenever a new silhouette is inserted, it is clipped against the existing edges in that bucket. For this purpose, it is important to take the depth value and winding of edges into account, i.e., if it is a left or right-facing silhouette. When a new edge is introduced in to the kD-tree, it is clipped against edges that are closer to the camera line, and clips the edges that are further away from it. The winding of the frontmost edge determines which segment of the clipped edge to keep.

For performance reasons, we only insert multi-view silhouette data in the current y-bucket rather than all buckets a patch overlaps in some embodiments. Instead, we rely on the backtracing from other intersection points to repeatedly find the same multi-view silhouette edge and insert it into the other buckets. This may seem counterintuitive, but yields better performance at comparable quality in some cases. To reduce the computational complexity, all per-patch setup (i.e., its corner points, $p_i$, and other necessary information) is computed only once and stored in a hash map, keyed on the triangle id:s that make up the edge.

Finally, to find multi-view silhouettes, in some embodiments, we only shoot forward rays through the centers of y-buckets, rather than jittered in y. This avoids the problem of getting patches that are only visible along the forward ray's y-coordinate, but not from the y-bucket's center, which may cause visual artifacts in rare cases. Our goal, in this example, is not to create an exhaustive representation of all multi-view silhouette edges, but instead to quickly construct a representative set of edges to aid the error measure and reconstruction. In regions of the domain where geometric edges have been missed, the algorithm automatically falls back on regular multi-dimensional adaptive sampling (MDAS) due to the use of contrast measures to detect shader discontinuities. See Hachisuka, T., Jarosz, W., Weistroffer, R., K. Dale, G. H. Zwicker, M., and Jensen, H. W. 2008, "Multidimensional Adaptive Sampling and Reconstruction for Ray Tracing", ACM Transactions on Graphics, 27, 3, 33.1-33.10.

Once the analytical back tracing has identified a set of visible segments on the camera line, a set of back tracing samples is generated in those segments, and these samples are inserted into the three-dimensional RD-tree holding all the samples. A back tracing sample is the radiance originating from the intersection point hit by forward ray, as seen from a point on the camera line, v. We exploit shader coherence by reusing shading computations for back tracing samples generated from the same intersection point. See FIG. 9, block 110.

Each forward ray will hit an intersection point that needs to be shaded. In the simplest implementation, we divide the shader into a view-dependent and a view-independent part. For every back tracing sample, the view-dependent part of the bidirectional reflectance distribution function (BRDF) is evaluated. This includes, for example, specular highlights, reflections, and refractions. The view-independent part of the BRDF is only evaluated once for every forward ray. Examples of this are irradiance gathering, visibility computations (e.g., shadows), and diffuse lighting. This alone results in a significant speedup. We also note that colors derived from mipmap texture filtering or anisotropic texture filtering are view-dependent. When looking towards a point on a surface, the texture lookups will get different footprints depending on the view point on the camera line. So far, our shading optimizations have been exact.

An approximate shader reuse method allows shading at different frequencies and may use interpolation or nearest neighbor lookups to obtain shading samples at arbitrary camera positions. For example, the specular component of a BRDF may vary rapidly, and may therefore need to be sampled densely for faithful reconstruction of shading samples. However, in some cases, it may be acceptable to sample the specular component at a lower frequency and then interpolate for the samples in between. Similarly, the texture lookups often vary with even lower frequency and may be more sparsely sampled.

Figure 5:
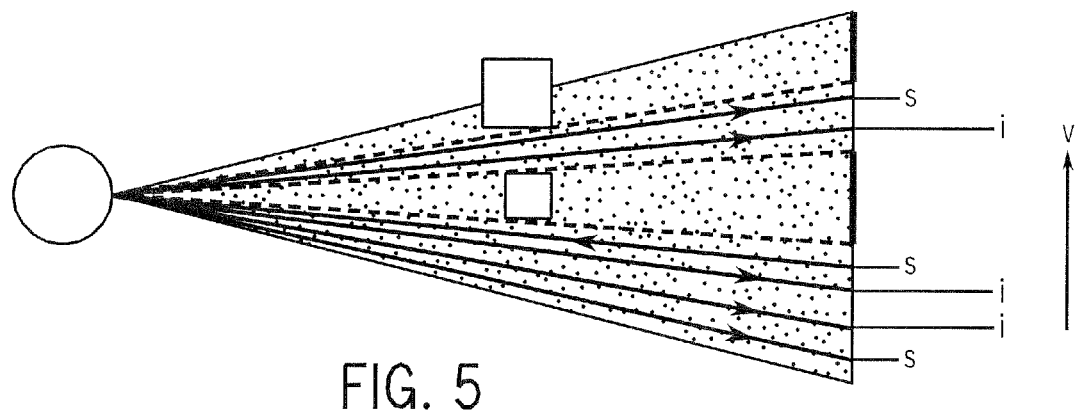
FIG. 5 is a depiction of the shared interpolated shading in accordance with one embodiment.

One embodiment of shading reuse is shown in FIG. 5. A forward ray, going left in the figure, hits the round object at an intersection point. Analytical visibility is computed by our algorithm. Only the portions of the vertical camera line that are not bold are visible from the intersection point. Five new back tracing samples are generated (rays going to the right). Diffuse shading computations (if this does not involve any texture lookups) can be done once for all six rays, and then reused by all rays. The letters to the right attempt to visualize frequency of specular shading computations in one embodiment. All rays marked with s compute specular shading from scratch, while the ones marked with i are interpolated from its neighbors. Since visibility has been determined analytically from a previous step, there are no visibility computations involved in the back tracing.

In another embodiment of shading reuse, shading is done at random locations along the camera line v, and more sparsely than the back tracing samples. The resulting shading values are then linearly interpolated for the back tracing samples. If a back tracing sample should lie above or below the camera line parameter v of the outer most shading samples, the shaded color value assigned to those back tracing samples is clamped to the closest shading sample. Similarly, the texture lookups can be done even more sparsely than the shading samples. Texture color values are assigned to shading samples in accordance with the interpolation and clamping rules described for shading samples and back tracing samples.

The number of back tracing samples per forward ray is a variable parameter, and can be adjusted depending on the shader. In general, however, we let the number of back tracing samples be proportional to the sum of lengths of the visible segments of the camera line found by the analytical back tracing step. In addition, the back tracing samples are jittered on the camera line, and for the sub-segment where the forward ray originated in, the corresponding back tracing sample is removed. Instead, the forward ray is used there, since it has high importance because it was generated by MDAS where the error measure was largest. The back tracing samples will, in general, be of lower importance than "full" samples generated by MDAS. Hence, there is no point in putting in an excessive number of back tracing samples, because this will make kD-tree lookups substantially slower. However, for expensive shaders, the benefit of reusing shader computations and evaluating parts of the shaders at lower frequencies is still significant, especially with an increasing number of views.

Next, we describe our reconstruction algorithm. See FIG. 9, block 112. Recall that all the samples are three-dimensional, i.e., have coordinates (x, y, v). In addition, each sample has some auxiliary data, such as color and a z-coordinate. From this sample set, n different images will be reconstructed, where n depends on the target display. For example, for a stereo display, n=2.

Figure 6:
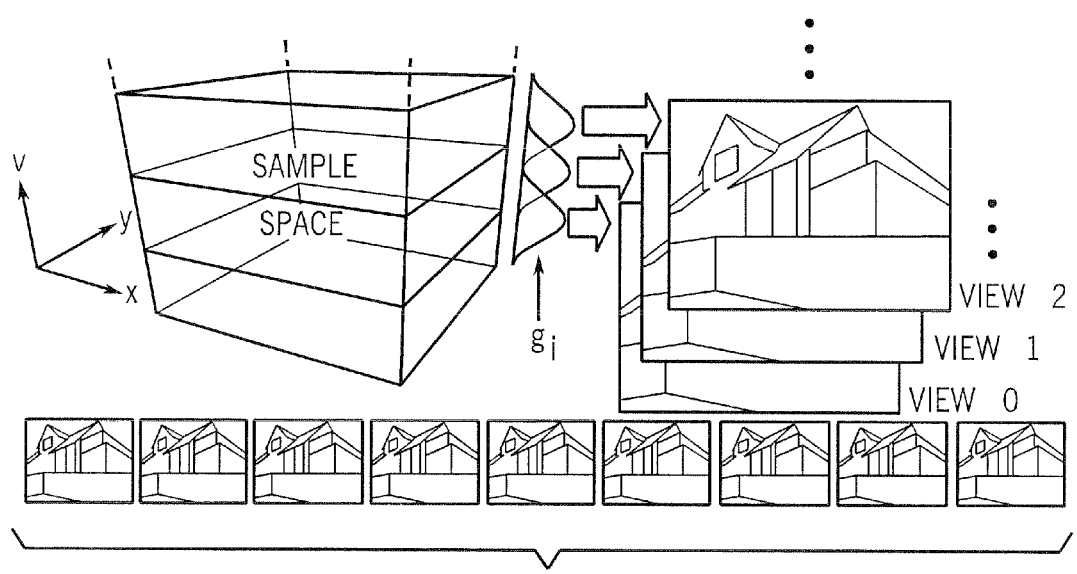
FIG. 6 depicts how reconstruction may be done using a reconstruction filter in one embodiment.

As shown in FIG. 6, after the sample generation step in our algorithm, we have a three-dimensional space, (x, y, v), of samples, where v is the view dimension, i.e., the parameter along the camera line. From this sample set, n images are reconstructed. In this case, n=9, but only three are shown to the right. An arbitrary filter kernel, $g_i$, along the v-axis can be used. At the bottom of FIG. 6, all nine images are shown.

The first steps are identical to the reconstruction algorithm of MDAS. Briefly, the kD-tree is first subdivided until each node holds one sample. As each sample is processed, the nearest neighbors are found, gradients are computed, and finally a structure tensor is computed per sample. After this preprocessing, the final color of a pixel is found by integrating along a line, here called the v-line, in the v-dimension in the middle of the pixel, i.e., with fixed (x,y)-coordinates. In a multi-view setting, only a particular range of v needs to be processed (see FIG. 6) for a particular view. MDAS then finds the kD-tree nodes that overlap with the v-line, and accumulates the contribution of each kD-tree node to the pixel color. This contribution is computed by placing an integration point on the v-line, (x,y), in the middle of the kD-tree node, $v_{mid}^{node}$, and computing the color contribution of the neighboring samples to the integration point. MDAS does this by finding the s samples in the kD-tree that are closest to the center of the node in the Euclidean sense in order to obtain a coarse set of approximate nearest neighbors, and this set is stored within each node. The Mahalanobis distances are then computed to these samples using the structure tensor. The color of the integration point is then the color of the nearest sample.

MDAS reconstructs high-quality edges when the kD-tree has a faithful representation of the true edge in itself. However, in the majority of cases, this is not true when our inexpensive back tracing samples are inserted. An example of this is illustrated in FIG. 7, showing non-uniform sample densities due to back tracing.

Figure 7:
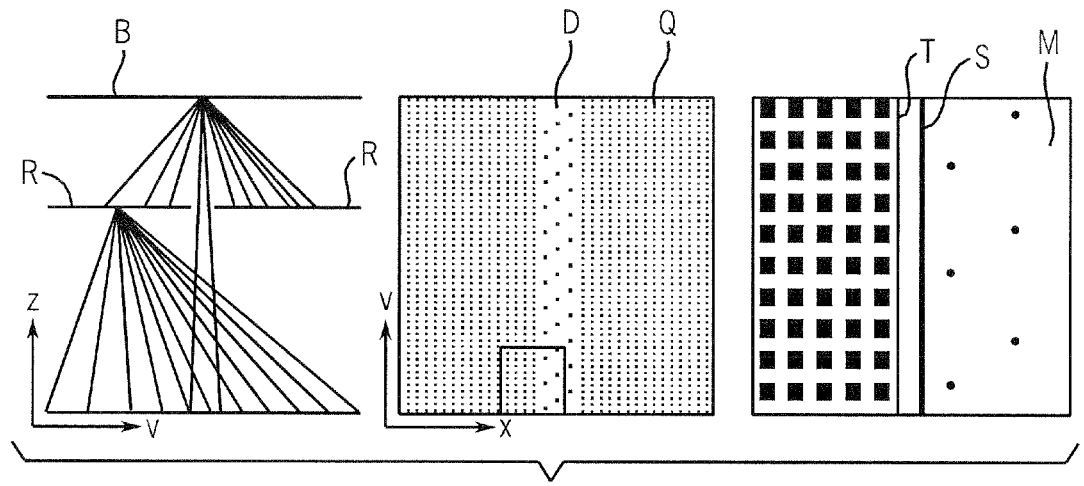
FIG. 7 is a depiction of non-uniform sample densities due to back tracing.

The leftmost depiction in FIG. 7 shows a scanline in the xz plane of a scene with two horizontal lines R in focus, and a horizontal line B in the background. For each forward ray, at the intersection point, a set of rays are traced back to the camera line. As can be seen, for a forward ray that hits the line B, only a fraction of the back rays will reach the camera line. In the middle figure, the epipolar plane is shown after a moderate number of forward rays and corresponding back rays have been traced. The "epipolar plane" is the xv-space for a certain y. Samples from the lines R are shown as squares Q, and samples from the background B are shown as black dots D. Note that the sample density is significantly lower in the region R. Finally in the right figure, a zoomed view from the epipolar plane is shown. The shaded backgrounds indicate the position of the true geometrical edge, but due to the different sampling densities, a reconstructed edge (the vertical line S) may bleed over into the less densely sampled region M, and hence be placed at a different location than the true edge T. Note that this figure is an illustrative example, not a true sample distribution. Therefore, we have developed a reconstruction technique that uses the multi-view silhouettes to solve this, and improve the reconstruction quality for the type of sample set that our algorithm generates.

Next, we describe how to substantially improve the integration over the pixel area when processing each kD-tree node overlapping the v-line. For a particular kD-tree node, and pixel, $(x_p, y_p)$, we also create an integration point at $(x_p, y_p v_{mid}^{node})$. Conceptually, we then search, in the x-direction, for the two closest edges to the integration point in our multi-view silhouette data structure. This is done as follows. The intersection of a multi-view silhouette edge, which is bilinear patch (FIG. 3), with a plane $y=y_p$ will be a straight line in xv-space by construction. This line equation is then used to compute the x-coordinate of a multi-view silhouette at $v=v_{mid}^{node}$. This is done for all the nearest multi-view silhouettes, and the closest edge with $x<x_p$ and the closest edge with $x \geq x_p$ are kept. This situation is illustrated to the left in FIG. 8.

Figure 8:
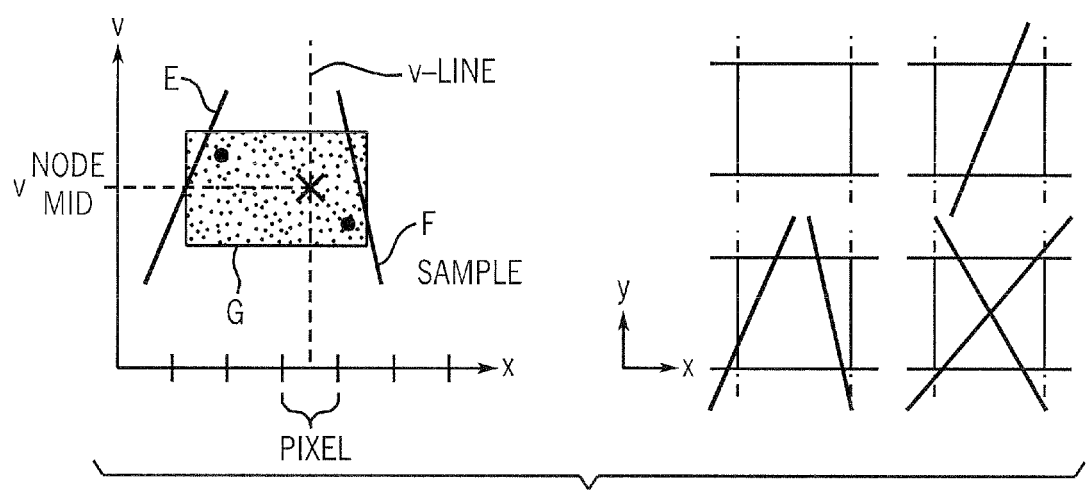
FIG. 8 is a depiction of the intersection of a multi-view silhouette edge for anti-aliasing in accordance with one embodiment.

On the left in FIG. 8, a node (box G) from the kD-tree of the samples, viewed in the epipolar plane, xv. The cross is the integration point on the integration line chosen for this kD-tree node, and black circles are samples. At $v=v_{mid}^{node}$, our algorithm searches in x for the two closest multi-view silhouettes (lines E and F). The closest multi-view silhouettes are evaluated for the y-value of the pixel center.

Once the nearest multi-view silhouette edges have been found, we project them to the image plane, (x,y), by creating new line equations from the multi-view silhouette edges at $v=v_{mid}^{node}$. These lines are then clipped against the pixel extents. With two edges, this can result in the four different configurations as shown to the right in FIG. 8, where the pixel is split into 1-4 regions. The color of each region is then computed using the closest (in Mahalanobis distance) samples in each region. At the same time, the areas, $a_i$, $i \in \{1, 2, 3, 4\}$ of these pixel regions are computed, where the sum of these areas is equal to the area of a pixel. Next, the s nearest, in the Euclidean sense, samples around the center point of the node are fetched directly from the node. The nearest samples are then classified into these different regions, and the color, $c_i$, of each region overlapping the pixel is selected based on Mahalanobis distance using only the samples in that region. The final color contribution of a kD-tree node is then $\Sigma_{i=1}^4 a_i c_i$, where $a_i$ may be zero. As a result, when there are 1-2 edges overlapping a pixel for a kD-tree node, our algorithm generates high-quality anti-aliased edges in the images. Note that if an edge splits a pixel into two pieces (top right example in FIG. 8), then $a_3=a_4=0$. In some embodiments, the user may want to use more than two splitting edges.

It should be noted that in some rather rare cases, there will not be any samples in one or more regions. In this case, the reconstructed color will simply be incorrect, and our remedy to this is to shoot a new ray into those regions, and use the color of that sample in the reconstruction. In order to avoid rebuilding the kD-tree, recomputing gradients and structure tensors etc., we simply discard the new sample after it has been used.

The y-dimension was discretized to a small number of y-bucket centers per scanline. As a consequence, this is quite prone to aliasing in the y-direction. To reduce this effect, we jitter the y-value of the integration point within the pixel, for each node and scanline during reconstruction. The y-bucket which is closest to the jittered integration point is used as a representative of the local geometry. This replaces aliasing with noise, given a sufficient number of y-buckets.

Figure 10:
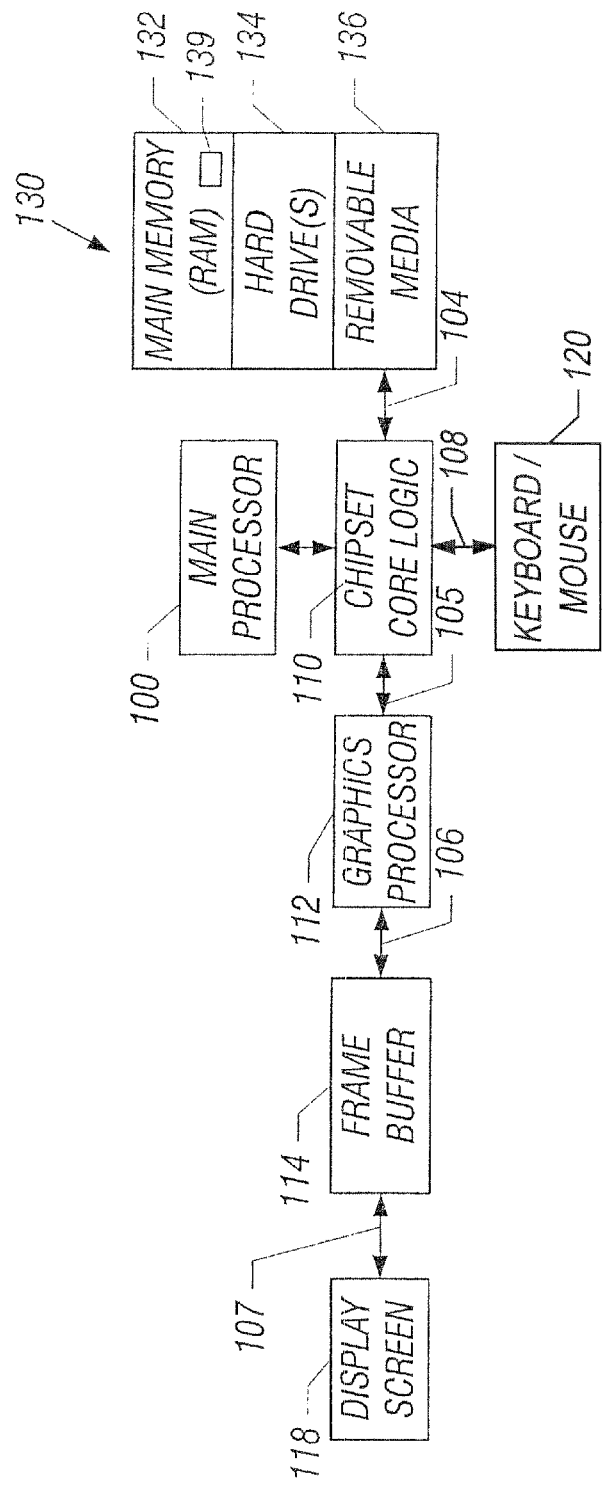
FIG. 10 is a hardware depiction for one embodiment.

The computer system 130, shown in FIG. 10, may include a hard drive 134 and a removable medium 136, coupled by a bus 104 to a chipset core logic 110. A keyboard and mouse 120, or other conventional components, may be coupled to the chipset core logic via bus 108. The core logic may couple to the graphics processor 112, via a bus 105, and the main or host processor 100 in one embodiment. The graphics processor 112 may also be coupled by a bus 106 to a frame buffer 114. The frame buffer 114 may be coupled by a bus 107 to a display screen 118. In one embodiment, a graphics processor 112 may be a multi-threaded, multi-core parallel processor using single instruction multiple data (SIMD) architecture.

In the case of a software implementation, the pertinent code may be stored in any suitable semiconductor, magnetic, or optical memory, including the main memory 132 or any available memory within the graphics processor. Thus, in one embodiment, the code to perform the sequences of FIG. 9 may be stored in a machine or computer readable medium, such as the memory 132 or the graphics processor 112, and may be executed by the processor 100 or the graphics processor 112 in one embodiment.

Figure 9:
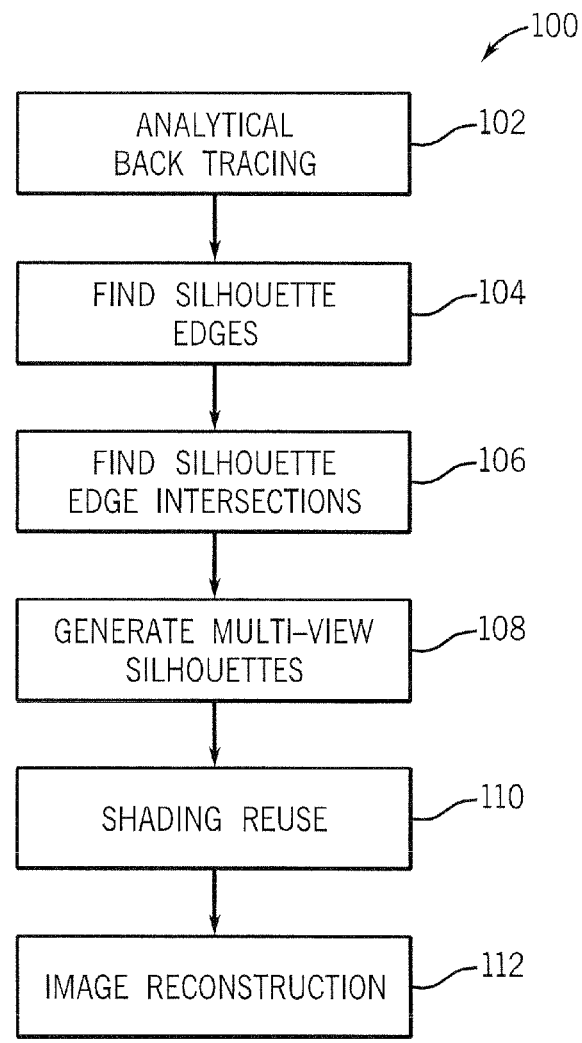
FIG. 9 is a flow chart for one embodiment.

FIG. 9 is a flow chart. In some embodiments, the sequences depicted in this flow chart may be implemented in hardware, software, or firmware. In a software embodiment, a non-transitory computer readable medium, such as a semiconductor memory, a magnetic memory, or an optical memory may be used to store instructions and may be executed by a processor to implement the sequences shown in FIG. 9.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method of multi-view image generation comprising:
   detecting discontinuities in a radiance function using multi-view silhouette edges.

2. The method of claim 1 including computing analytical visibility between shading points and a camera line.

3. The method of claim 2 including reconstructing using multi-view silhouette edges, where a pixel is divided into a number of regions.

4. The method of claim 2 including inserting back tracing samples based on analytical visibility.

5. The method of claim 3 including shooting a new ray for regions with no samples.

6. The method of claim 2 including sharing shading computations for visibility segments on the camera line.

7. The method of claim 6 including shading at different frequencies.

8. The method of claim 1 including detecting multi-view silhouette edges inside a back tracing triangle.

9. The method of claim 1 including discovering silhouette edges by processing only back facing triangles as seen from an intersection point.

10. The method of claim 1 including discovering silhouette edges by testing only triangles that intersect a back tracing triangle plane.

11. A non-transitory computer readable medium storing instructions to enable a computer to:
    generate a multi-view image by detecting discontinuities in a radiance function using multi-view silhouette edges.

12. The medium of claim 11 further storing instructions to compute analytical visibility between shading points and a camera line.

13. The medium of claim 12 further storing instructions to reconstruct using multi-view silhouette edges, where a pixel is divided into a number of regions.

14. The medium of claim 12 further storing instructions to insert back tracing samples based on analytical visibility.

15. The medium of claim 13 further storing instructions to shoot a new ray for regions with no samples.

16. The medium of claim 12 further storing instructions to share shading computations for visibility segments on the camera line and to shade at different frequencies.

17. The medium of claim 11 further storing instructions to detect multi-view silhouette edges inside a back tracing triangle.

18. The medium of claim 11 further storing instructions to discover silhouette edges by processing only back facing triangles as seen from an intersection point.

19. The medium of claim 11 further storing instructions to discover silhouette edges by testing only triangles that intersect a back tracing triangle plane.

20. The medium of claim 11 further storing instructions to discover back facing triangles that share an edge and to ignore the shared edge during silhouette edge discovery.

21. An apparatus comprising:
    a processor to generate a multi-view image by detecting discontinuities in a radiance function using multi-view silhouette edges; and
    a storage coupled to said processor.

22. The apparatus of claim 21, said processor to compute analytical visibility between shading points in a camera line.

23. The apparatus of claim 22, said processor to reconstruct using multi-view silhouette edges, where a pixel is divided into a number of regions.

24. The apparatus of claim 22, said processor to insert back tracing triangles based on analytical visibility.

25. The apparatus of claim 23, said processor to shoot a new ray for regions with no samples.

26. The apparatus of claim 22, said processor to share shading computations for visibility segments on the camera line and to shade at different frequencies.

27. The apparatus of claim 21, said processor to detect multi-view silhouette edges inside a back tracing triangle.

28. The apparatus of claim 21, said processor to discover silhouette edges by processing only back facing triangles as seen from an intersection point.

29. The apparatus of claim 21, said processor to discover silhouette edges by testing only triangles that intersect a back facing triangle plane.

30. The apparatus of claim 21, said processor to discover back tracing triangles that share an edge and to ignore the shared edge during silhouette edge discovery.

* * * * *